UNITED STATES PATENT OFFICE.

ERNST M. JOHANSEN, OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA.

EMULSION AND METHOD OF PRODUCING IT.

1,373,661. Specification of Letters Patent. Patented Apr. 5, 1921.

No Drawing. Application filed December 14, 1920. Serial No. 430,789.

*To all whom it may concern:*

Be it known that I, ERNST M. JOHANSEN, a citizen of the United States, residing in the city and county of Philadelphia, State of Pennsylvania, have invented certain new and useful Improvements in Emulsions and Methods of Producing Them, of which the following is a specification.

My invention relates to water emulsions of oily mineral substances, as bituminous material, including natural and artificial asphaltic materials, coal tar and the like; mineral oils, as from coal tar and the like, petroleum and shale oils, and distillates, residua or products thereof; and waxes, such as paraffin wax and the like.

In accordance with my invention, emulsions of materials of the character referred to with water are formed by the employment of sulfonic soaps which are sludge sulfonates, the alkali metal salts of those sulfonic acids derived from petroleum products and shale oils, and particularly from the acid sludge resulting from treatment, by strong sulfuric acid, of petroleum or distillate or product thereof, or practically any light or heavy mineral oil, or of similar products from shale oil, these sludge sulfonates being characterized by their solubility in water and their complete or substantially complete insolubility in ether or petroleum hydrocarbons.

In these emulsions the water is in the outer or continuous phase, and the emulsions are therefore water soluble or miscible spontaneously with water.

It is characteristic of my invention that by employment of the aforesaid emulsifying agent, sludge sulfonates, there result improved emulsifying action and easier preparation, and better and more stable emulsions.

In accordance with my invention, a smaller quantity of the aforesaid sludge sulfonates will produce as satisfactory emulsions as may be produced by relatively larger quantities of other emulsifying agents, as soaps derived from oleic acid, resin, or resin oil, etc.

In emulsifying the asphaltic residuum from distillation of asphaltic or semi-asphaltic base oils, the amount of sludge sulfonates employed may range from about 1.4 per cent. to about 8 per cent. by weight of the asphaltic residuum, about 3 per cent. being preferred when emulsifying such material. The sludge sulfonates are dissolved in water to form an aqueous soap solution with which is then combined the asphaltic residuum, at suitable temperature to procure suitable fluidity, stirring or other suitable agitation being resorted to to cause emulsification and hasten the action. In the resultant emulsion the water is the outer or continuous phase, while the asphaltic residuum is the discontinuous or dispersed phase. To such an emulsion water may be added without breaking the emulsion, the proportion of water to asphaltic residuum, by weight, being from about 30 per cent. upward to any suitable proportion.

Sludge sulfonates in like proportion may be similarly employed for making a similar emulsion of the tarry or asphaltic residuum resulting from cracking petroleum, as fuel or gas oil, either under pressure or not. A suitable material for such an emulsion is the so-called pressure still tar, which is the residuum resulting from cracking petroleum under pressure.

Residual asphalts suitable for emulsification as such are those which will flow at temperatures below 212 degrees F. Residual asphalts of higher melting points may be emulsified after fluxing with suitable oils.

By employment of the sludge sulfonates in like proportion, natural or native asphalt, or the same fluxed with oil, may be emulsified, and in general bituminous materials, as tar, etc.

The above described emulsions of bituminous and asphaltic materials may be employed in water proofing, roofing, dust laying, and binding for pavement or road metal or minerals, or in analogous relations where binders are utilizable, the bituminous material after evaporation of the water with which it has been emulsified then acting as a binder, water proofing, and the like.

Heavy petroleum distillates, as wax tailings, may be similarly emulsified by like proportion of the sludge sulfonates, the emulsion being employed for water proofing, or for providing a binder in those relations in which the heavy distillates or wax tailings are not too soft.

Refined and unrefined mineral oil distillates may be similarly emulsified by use of sludge sulfonates in the aforesaid small proportions. For example, naphtha, kerosene or gasolene may be emulsified, their emulsions being employed as insecticides, or for any other suitable purpose.

Similar emulsions of oil may be produced for use as cutting lubricants, such as employed in cutting threads upon bolts, nuts, etc.

Similarly, waxes, as paraffin wax, brought to suitable temperature, may be similarly emulsified by the aforesaid sludge sulfonates in the small proportions described. Such an emulsion of wax may be spread upon paper or the like, leaving, after separation of the water, a coating of wax effecting water proofing or other desirable results.

Similarly, emulsions of vaseline and like materials may be produced.

By way of example merely, and without limitation of my invention thereto, it may be stated that in making an emulsion of asphaltic or other material, a nucleus is first formed by employment of strong soap solution and the asphaltic or other material stirred or agitated therewith at suitable temperature, an emulsion being formed with the aqueous solution as the continuous or external phase. From time to time there are added, preferably alternately, increments of water and of asphaltic or other material until the desired proportions are reached, the original amount of soap employed in forming the nucleus being the total soap employed. It will be understood, however, that less than the total soap may be employed in forming the nucleus, and further soap, within the proportions stated, may be added at a later stage.

It is characteristic of the hereinbefore described emulsions that the water is the continuous or external phase, with the result that the emulsion may be diluted or mixed with water in practically any desired proportions.

By employment of sludge sulfonates as described, the emulsifying action is improved in that smaller quantities of the sludge sulfonates will produce as satisfactory emulsions of a given material as may be produced when employing larger quantities of other emulsifying agents, as soaps derived from oleic acid, resin or resin oil, etc. Furthermore, the emulsions are more easily prepared or produced when using these sludge sulfonates. Better emulsions are obtained in that they are, when diluted with water, of high degree of homogeneity; the emulsions are further characterized by the fact that they are little affected by stirring, shaking or other mechanical jar or agitation, which often cause separation of diluted emulsions prepared with other soaps.

The emulsions produced by these sludge sulfonates are of high degree of stability, and change less during storage than those prepared with other emulsifying agents.

A further characteristic lies in the fact that when employing the sludge sulfonates, the presence of substantial quantities of electrolyte or electrolytes in the water is permissible, since with these soaps the effect of the electrolytes in their tendency to prevent emulsification or to break the emulsion when once formed, is less than when other soaps are employed. With some soaps it is necessary or desirable to employ distilled water or water substantially free of electrolytes, whereas in accordance with my invention, while distilled water may be employed, it is not so essential as when employing soaps of other characters.

What I claim is:

1. The method of emulsifying oily material of mineral origin, which consists in dispersing the same in water in the presence of water soluble sulfonates resulting from acid treatment of mineral oil or product thereof and in amount from about $1\frac{1}{2}$ per cent. to about 8 per cent. by weight of said material.

2. The method of emulsifying oily material of mineral origin, which consists in dispersing the same in water in the presence of water soluble sulfonates derived from acid sludge and in amount from about $1\frac{1}{2}$ per cent. to about 8 per cent. by weight of said material.

3. The method of emulsifying bituminous material, which consists in rendering the same of suitable fluidity, and dispersing the same in water by the action of water soluble sulfonates in amount from about $1\frac{1}{2}$ per cent. to about 8 per cent. by weight of said bituminous material.

4. The method of emulsifying asphaltic material comprising residuum from distillation of petroleum of asphaltic or semi-asphaltic base, which consists in dispersing the same in water by the action of water soluble sulfonates in the proportion from about $1\frac{1}{2}$ per cent. to about 8 per cent. by weight of said asphaltic material.

5. The method of emulsifying asphaltic material comprising residuum from distillation of petroleum of asphaltic or semi-asphaltic base, which consists in dispersing the same in water by the action of water soluble sulfonates in the proportion of about 3 per cent. by weight of said asphaltic material.

6. An emulsion of oily material of mineral origin, comprising said material dispersed in water containing water soluble sulfonates in the proportion from about $1\frac{1}{2}$ to about 8 per cent. by weight of said material.

7. An emulsion of bituminous material comprising said material dispersed in water containing water soluble sulfonates in the proportion from about 1½ per cent. to 8 per cent. by weight of said bituminous material.

8. An asphaltic emulsion comprising asphaltic residuum from petroleum distillation dispersed in water containing sulfonates in amount from 1½ per cent. to about 8 per cent. by weight of said asphaltic material.

9. An asphaltic emulsion comprising asphalt residuum from petroleum distillation dispersed in water containing sulfonates in amount of about 3 per cent. by weight by said asphaltic material.

In testimony whereof I have hereunto affixed my signature this 13th day of December, 1920.

ERNST M. JOHANSEN.